US007351458B2

(12) United States Patent
Leighton

(10) Patent No.: US 7,351,458 B2
(45) **Date of Patent: *Apr. 1, 2008**

(54) PLASTICS BAGS AND METHODS OF MAKING THE SAME

(75) Inventor: Murray Edward Bruce Leighton, Harrogate (GB)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/115,908

(22) Filed: Apr. 27, 2005

(65) Prior Publication Data

US 2005/0186368 A1 Aug. 25, 2005

Related U.S. Application Data

(62) Division of application No. 09/857,735, filed on Jun. 8, 2001, now Pat. No. 6,951,420.

(30) Foreign Application Priority Data

Sep. 27, 2000 (WO) .................... PCT/GB00/03699

(51) Int. Cl.
*B32B 3/26* (2006.01)

(52) U.S. Cl. ........................ 428/43; 428/126; 428/130

(58) Field of Classification Search .................. 428/43, 428/124, 126, 130; 383/35, 210.1
See application file for complete search history.

(56) References Cited

U.S. PATENT DOCUMENTS 2,262,111 A 11/1941 Moore ........................ 229/55
2,322,654 A 6/1943 Moore ........................ 229/55
2,997,166 A 8/1961 Pratt ........................ 206/56
3,085,738 A 4/1963 Bok ........................ 229/62
3,410,393 A 11/1968 Lee ........................ 206/46
3,680,689 A 8/1972 Grundschober et al. .. 206/47 A
3,738,566 A 6/1973 Foster ........................ 229/62
3,746,215 A 7/1973 Ausnit et al. ................ 222/92
4,480,752 A 11/1984 Jacobs ........................ 206/632
4,481,669 A 11/1984 Pezzana et al. ............... 383/94
4,518,087 A 5/1985 Goglio ........................ 206/632
4,786,190 A 11/1988 Van Erden et al. ........... 383/61
4,909,017 A 3/1990 McMahon et al. ............ 53/410

(Continued)

FOREIGN PATENT DOCUMENTS

DE 26 22 659 12/1977

(Continued)

*Primary Examiner*—Alexander Thomas
(74) *Attorney, Agent, or Firm*—Woodcock Washburn, LLP

(57) ABSTRACT

A plastics bag has at least one seal (34, 36) extending parallel to the mouth of the bag to close the sides. Preferably, a reclosable zipper seal (36) is provided below a top seal (34). A novel tag is provided, secured to the zipper seal (36) and extending through the top seal (34). The tag (11) is generally M-shaped in cross-section with its outside legs secured to the seals and with an inner tuck which the consumer can withdraw from the mouth of the bag and break open to make an access hole through the seal or seals into the interior of the bag to facilitate full opening of the mouth of the bag. Methods of manufacturing such bags are also described, particularly for use with form-fill-seal machines.

5 Claims, 2 Drawing Sheets

U.S. PATENT DOCUMENTS

| | | | | | |
|---|---|---|---|---|---|
| 4,917,929 | A | * | 4/1990 | Heinecke | 428/41.4 |
| 4,936,456 | A | | 6/1990 | Bell et al. | 206/439 |
| 4,947,525 | A | | 8/1990 | Van Erden | 24/304 |
| 4,971,454 | A | | 11/1990 | Branson et al. | 383/61 |
| 5,045,040 | A | | 9/1991 | Vetter | 493/194 |
| 5,077,064 | A | | 12/1991 | Hustad et al. | 426/106 |
| 5,106,917 | A | * | 4/1992 | Lee et al. | 525/229 |
| 5,121,996 | A | * | 6/1992 | Scarrow | 383/44 |
| 5,224,779 | A | | 7/1993 | Thompson et al. | 383/5 |
| 5,330,269 | A | | 7/1994 | Kamada et al. | 383/210 |
| 5,392,589 | A | | 2/1995 | Buchanan | 53/412 |
| 5,435,864 | A | | 7/1995 | Machacek et al. | 156/66 |
| 5,672,009 | A | | 9/1997 | Malin | 383/204 |
| 5,769,772 | A | | 6/1998 | Wiley | 493/189 |
| 5,774,954 | A | | 7/1998 | Ramsey et al. | 24/587 |
| 5,911,508 | A | | 6/1999 | Dobreski et al. | 383/5 |
| 6,017,412 | A | | 1/2000 | Van Erden et al. | 156/290 |
| 6,124,018 | A | | 9/2000 | Yoshino | 428/122 |
| 6,212,857 | B1 | | 4/2001 | Van Erden | 53/412 |
| 6,257,763 | B1 | | 7/2001 | Stolmeier et al. | 383/5 |
| 6,270,255 | B1 | | 8/2001 | Kaufman et al. | 383/5 |
| 6,327,837 | B1 | | 12/2001 | Van Erden | 53/412 |
| 6,328,472 | B1 | | 12/2001 | Laurence et al. | 383/211 |
| 6,477,829 | B1 | | 11/2002 | Hunter | 60/225 |

FOREIGN PATENT DOCUMENTS

| | | |
|---|---|---|
| EP | 0 779 222 A1 | 6/1997 |
| JP | 4 577 50 | 2/1992 |

* cited by examiner

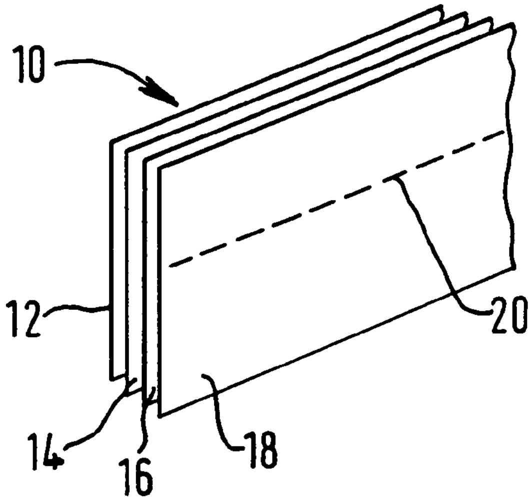
FIG. 1.
FIG. 2.
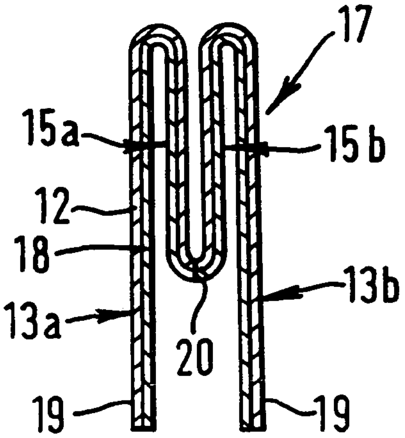
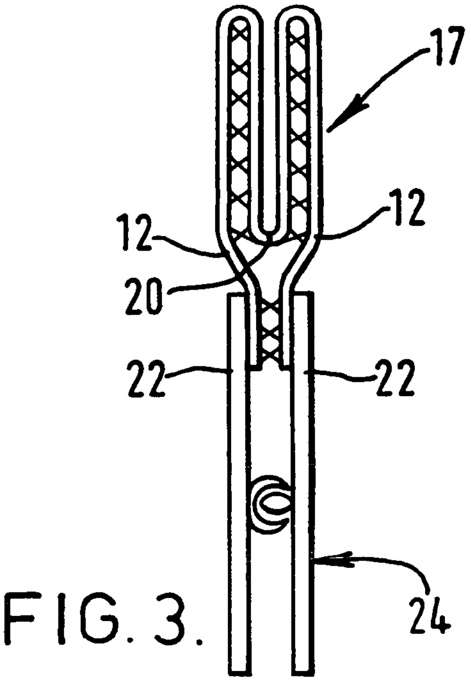
FIG. 3.
FIG. 4.
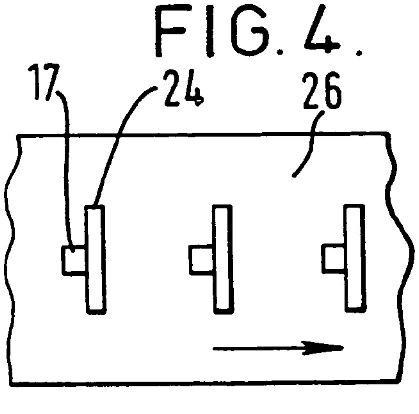
FIG. 5.
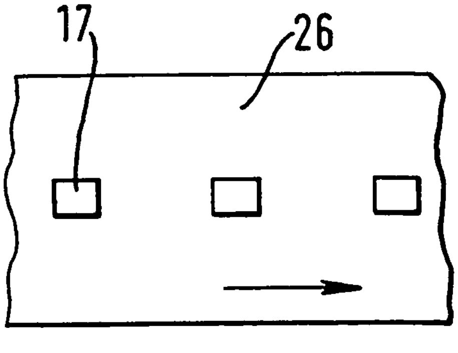

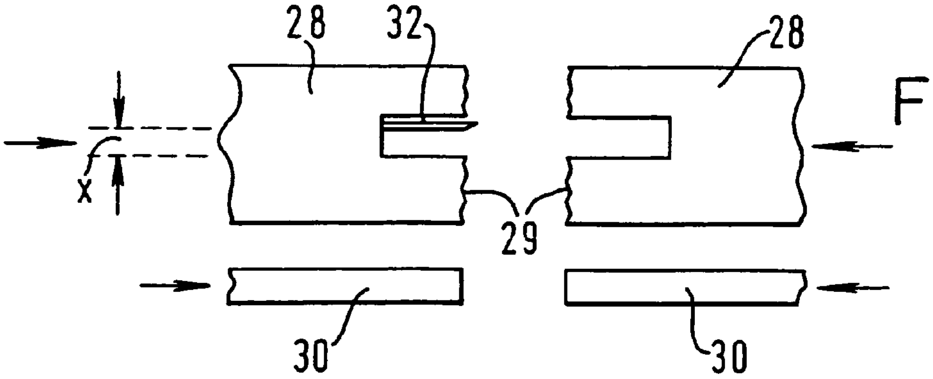
FIG. 6.
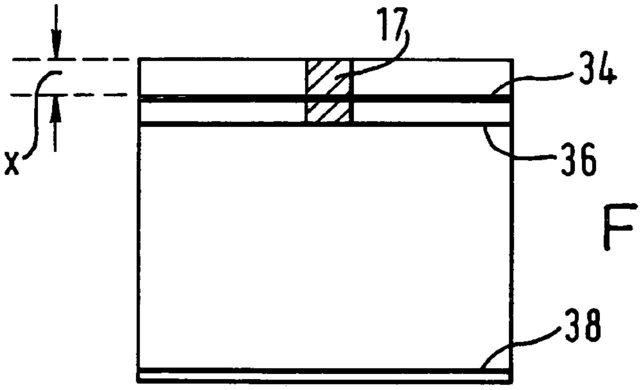
FIG. 7.
FIG. 8.
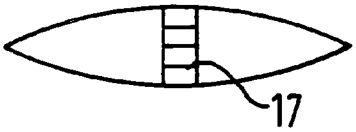
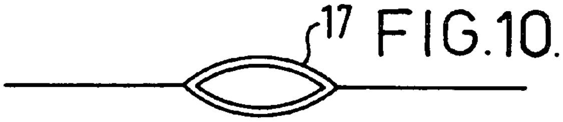
FIG.10.
FIG.9.
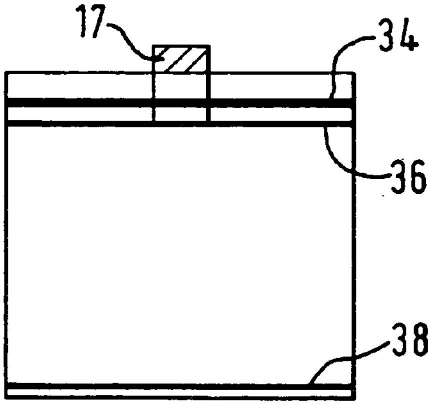
FIG.11.
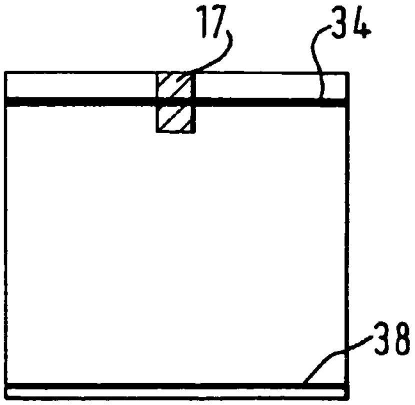

PLASTICS BAGS AND METHODS OF MAKING THE SAME

CROSS-REFERENCE TO RELATED APPLICATIONS

This application is a divisional application and claims priority under 35 U.S.C. §120 and §121 to U.S. patent application Ser. No. 09/857,735 filed Jun. 8, 2001, now U.S. Pat. No. 6,951,420, which is herein incorporated by reference in its entirety.

This invention relates generally to plastics bags, and particularly to plastics bags which have been formed, filled and sealed. The invention is also concerned with methods of manufacturing such bags to incorporate means by which they can easily be opened. The invention is also concerned with tag material used as a means to facilitate the opening of such bags.

Plastics bags which have been formed, filled and sealed are often difficult to open because of the effectiveness of the seal. In many cases, the pulling force needed on the sides of the bag to open the top seal is substantial.

It is an object of the present invention to provide means for more easily opening sealed bags, especially those which have been formed, filled with contents and sealed.

It is also an object of the present invention to provide a method of manufacturing a plastics bag to incorporate means for easy opening.

In accordance with one aspect of the present invention there is provided a plastics bag comprising a pair of sides defining an openable mouth along one margin of the sides, a seal extending parallel to said margin to close the sides, and a tag within a part of the seal which can be withdrawn and used to open a zone of the seal to permit access to the interior of the bag.

Preferably, the tag is positioned substantially centrally of the said margin of the bag.

Preferably, the tag is folded to lie within the contour of the bag sides until withdrawn.

In a preferred embodiment, the tag is folded in a generally M-shaped configuration in cross-section, with the outside surfaces of the outside legs of the tag being sealed to the seal and/or to the sides of the bag, and with the inside legs being arranged to be withdrawn from between the outside legs.

It is of assistance if the inside surfaces of the outside legs of the tag are in peel seal engagement with the outside surfaces of the inside legs of the tag in said M-shaped configuration.

The tag is preferably provided with a line of weakness, e.g. perforations, along the junction of the inside legs of the tag.

In a preferred embodiment, the bag has two seals extending parallel to the said margin, one of which is a reclosable zipper seal.

Preferably, the zipper seal has marginal flanges extending laterally from interengageable male and female closure members, and the tag is sealed to the inside surfaces of flanges extending from the closure members towards the mouth of the bag.

In accordance with another aspect of the present invention there is provided a method of manufacturing a plastics bag which includes providing a seal parallel to a margin of a bag which defines an openable mouth, and incorporating into a part of the seal a tag which can be withdrawn and used to open a zone of the seal to permit access to the interior of the bag.

In one preferred method, the method includes sealing the tag to flanges of a reclosable zipper seal having interengageable male and female closure members, sealing the zipper seal and tag to a host material which is to form the sides of the bag, forming the bag, and creating a second seal parallel to said margin, on the side of the zipper seal which is closer to the mouth of the bag, with the tag extending through the second seal.

In an alternative method, the method includes sealing the tag to a host material which is to form the sides of the bag, forming the bag, and creating the seal parallel to said margin with the tag extending through the seal.

It will therefore be appreciated that the present invention can be used both with bags which incorporate a reclosable zipper seal along with the top seal, and also with bags which have a top seal only.

Also in accordance with the invention there is provided tag material comprising an elongate strip comprising a first layer having an outside surface suitable to be sealed to a web of plastics material and a second layer having an outside surface having peel-seal properties, wherein the strip is folded about its longitudinal axis into a generally M-shaped configuration with the first layer on the outside and with the outer legs of the folded strip extending beyond the tuck.

The tag which is used as the agent by which the seal can be broken and the bag opened is preferably a piece of laminated material. The laminated material preferably comprises an outer layer to be sealed to the host film, a layer to provide the tag with strength, a layer to provide the tag with thermal insulation and a peel seal layer.

The method of manufacturing a bag in accordance with the invention is particularly appropriate for use with a zipper strip applied transversely to the direction of advance of the host material, i.e. using cross-web technology.

In order that the invention may be more fully understood, a number of presently preferred embodiments will now be described by way of example and with reference to the accompanying drawings. In the drawings:

FIG. 1 shows the structure of a laminated material suitable for use as a tag in accordance with the present invention;

FIG. 2 shows the laminated material folded to make a tag;

FIG. 3 is a sectional view showing the insertion of a folded tag into a zipper strip;

FIG. 4 shows the zipper strip and tag sealed to a host material;

FIG. 5 shows a modified embodiment where just the folded tag is sealed to the host material;

FIG. 6 is a schematic view of a sealing jaw construction on a form-fill-seal machine for use in the method according to the present invention;

FIG. 7 is a front view of a bag in accordance with the invention provided with a top seal, a zipper seal and a tag;

FIG. 8 is a top view of the bag of FIG. 7;

FIG. 9 shows the bag of FIG. 7 with the tuck of the tag withdrawn;

FIG. 10 shows the bag of FIG. 9 with the tag opened; and

FIG. 11 is a front view of a bag in accordance with the invention provided with just a top seal and a tag.

Referring first to FIG. 1 there is shown a laminated material 10 for use in making tags for use in bags in accordance with the invention. The material 10 comprises an outer layer 12 of a material suitable to be sealed to a host material, i.e. a plastics film. One suitable material is polyethylene. Next to the polyethylene layer 12 is a layer 14 to give the laminate strength. This can be of polyethylene terephthalate (PET)material. There is then a layer 16, for example of foil material, to give the laminate heat insulation properties. Next to this layer is a layer 18 of material which has peel seal properties. These layers are bonded together. A line of perforations 20 is provided centrally along the length of the laminate material to provide a line of weakness. These perforations can be holes or slits through the laminate.

The laminate material 10 can be stored on a roll. The laminate material is folded, as shown in FIG. 2, substantially into an "M" shape, with two outer legs 13*a*, 13*b* and two inner legs 15*a*, 15*b* which form an inner tuck. In FIG. 2 is shown an embodiment of tag material which has only the two layers 12 and 18. Each of the intermediate layers 14 and 16 of FIG. 1 can be regarded as optional, although desirable. The outer legs extend down beyond the tuck and the line of perforations 20 is then at the bottom of the tuck, i.e. at the junction of the inner legs 15*a*, 15*b*. The material can be stored on a roll already doubled over about the perforation line 20 and with the tuck folded in and with the peel seal layer surfaces which are then facing one another welded together. The facing surfaces of peel seal material are sealed together, as represented by the "crosses" in FIG. 3. Alternatively, the peel seal layer surfaces can be welded together at a subsequent stage in the manufacture of the bag.

A section of the folded laminated material 10 is fed into an applicator and is cut to length to make a tag 17. Adhesive is then applied to the outer faces 19 of the outer layer 12 in the region of the outer legs 13*a*, 13*b* which extend beyond the tuck and the tag 17 is then inserted between the top flanges 22 of a cross web zipper 24 as shown in FIG. 3. The adhesive thus sticks the tag 17 to the zipper 24.

In one embodiment of form-fill-seal machine, the zipper 24 and tag 17 are then sealed jointly to the host material 26 as shown in FIG. 4. The host material 26 is a length of plastics film or web from which the bag is to be made. They can be applied to the film using a cross web technique, and sealed in position. This is done if the bag is to have both a top seal and a zipper seal.

If the final bag is not to include a zipper seal, but only a top seal, then the folded tag 17 is not affixed to a zipper strip as shown in FIG. 3, but is sealed by itself to the host material 26, as shown in FIG. 5. The tags 17 are positioned at appropriate intervals along the length of the advancing host material 26.

The host material 26 carrying the zippers and tags (FIG. 4), or the tags alone (FIG. 5), is then run as normal through a form-fill-seal machine including passage over a forming shoulder. FIG. 6 shows the sealing jaw construction used to seal the bag after filling when the bag is to incorporate both a zipper seal and a top seal. The sealing jaw construction comprises upper sealing jaws 28 and zipper sealing jaws 30. The upper jaws 28 incorporate impulse or resistance heating means in their facing surfaces 29 to effect the required top seal. The web material 26 is thereby sealed to itself along the greater part of the width of the bag, but in the area of the tag 17 the web material 26 is sealed to those parts of the outside surfaces of the outer legs 13*a*, 13*b* of the tag which are in alignment with the tuck. Similarly, the lower jaws 30 effect the sealing of the zipper seal flanges to the web material 26.

The jaws also incorporate a knife 32 to sever the bags. In FIG. 5 there is indicated a spacing x. This is the minimum distance required to incorporate the tag. Upon the top end seal of the bag being made by the jaws 28, the tag 17 protrudes through the seal with the outer portions of the tag sealed to the host film. This is illustrated in FIG. 7 which shows the bag construction. Here there is a top seal 34 and a zipper seal 36 and a bottom seal 38. The tag is sandwiched between the webs of the film and the distance between the top seal 34 and the top end of the bag is again x as in FIG. 6. This distance x can be approximately 5 millimeters.

If the bag incorporates no zipper seal 36, but only a top seal 34, then the tag 17 will simply protrude from the top seal 34, as shown in FIG. 11.

FIG. 8 shows a top view of the bag with the tag 17 in the center of the seal.

In order to open the sealed bag the tucked-in portion of the tag is pulled up by a finger as shown in FIG. 9, with the peel seals opening. This creates a protruding loop. A finger can then be inserted into the loop of the tag to break the perforations 20. This creates two protruding flaps. When the two flaps of the tag which are thus created are pulled apart the peel seal material of the tag overlaid by seal 34, and by seal 36 if present, will give, allowing entry to the inside of the bag through the opened tag, as shown in FIG. 10. The opening of the peel seal material gives an access hole through the top seal 34, and through the zipper seal 36 if provided, directly to the interior of the bag. The opening can then be enlarged.

The invention claimed is:

1. Tag material in the form of a continuous length of an elongate strip comprising a first layer and a second layer, said first layer having an outside surface suitable to be sealed to a web of plastics material and said second layer, having an outside surface, said outside surface of said second layer having first and second longitudinal marginal edge portions extending adjacent to the respective longitudinal edges of the elongate strip, said longitudinal marginal edge portions having peel-seal properties, wherein the strip is folded along its longitudinal axis into a generally M-shaped cross-sectional configuration with two outer legs and two inner legs that form an inner tuck, wherein the first layer is on the outside of the M-shaped configuration and the outer legs extend beyond the tuck.

2. Tag material according to claim 1, in which a line of weakness is provided along the length of the strip so as to be located at the apex of the tuck when folded.

3. Tag material according to claim 2, in which the line of weakness comprises a row of perforations through the strip.

4. Tag material according to claim 1, in which the strip also includes a layer of strengthening material between the first and second layers.

5. Tag material according to claim 1, in which the strip also includes a layer of heat insulating material between the first and second layers.

* * * * *